United States Patent
Youssef et al.

(10) Patent No.: US 10,018,730 B2
(45) Date of Patent: Jul. 10, 2018

(54) METHOD AND APPARATUS FOR DETERMINING A POSITION OF A GNSS RECEIVER

(71) Applicant: FATHOM SYSTEMS INC., Vancouver (CA)

(72) Inventors: Mohamed Youssef, Vancouver (CA); Ashkan Izadpanah, Vancouver (CA); Muhammad Haris Afzal, Vancouver (CA); Behnam Aminian, Vancouver (CA)

(73) Assignee: FATHOM SYSTEMS INC., Vancouver (CA)

( * ) Notice: Subject to any disclaimer, the term of this patent is extended or adjusted under 35 U.S.C. 154(b) by 489 days.

(21) Appl. No.: 14/690,228

(22) Filed: Apr. 17, 2015

(65) Prior Publication Data
US 2015/0219769 A1    Aug. 6, 2015

Related U.S. Application Data (63) Continuation of application No. 13/434,684, filed on Mar. 29, 2012, now abandoned, which is a (Continued)

(51) Int. Cl.
G01S 19/22 (2010.01)
G01S 19/26 (2010.01)
(Continued)

(52) U.S. Cl.
CPC ............ G01S 19/22 (2013.01); G01S 19/24 (2013.01); G01S 19/26 (2013.01); G01S 19/426 (2013.01); G01S 19/48 (2013.01)

(58) Field of Classification Search
CPC ....................................................... G01S 19/22
See application file for complete search history.

(56) References Cited

U.S. PATENT DOCUMENTS 6,289,280 B1    9/2001    Fernandez-Corbaton et al.
6,417,801 B1    7/2002    van Diggelen
(Continued)

FOREIGN PATENT DOCUMENTS

CN    102100058 A    6/2011
EP    1 538 454 A1    6/2005
(Continued)

OTHER PUBLICATIONS

Ublox, "GPS Essentials of Satellite Navigation Compendium" GPS-X-2007-D, Copyright 2009. pp. 1-174. (Year: 2009).*
(Continued)

Primary Examiner — Gregory C. Issing
(74) Attorney, Agent, or Firm — Seed IP Law Group LLP (57) ABSTRACT

A method of determining a position of a GNSS receiver includes: receiving, at the GNSS receiver, information from at least two GNSS satellites and an estimated location area from a non-GNSS positioning application, determining candidate pseudoranges corresponding to candidate correlation peaks determined based on the information received from the at least two GNSS satellites; determining possible positions of the GNSS receiver using the candidate pseudoranges and the estimated location area; determining a best possible position of the GNSS receiver from the possible positions; and setting the best possible position as the position of the GNSS receiver; wherein when multiple candidate correlation peaks corresponding to one of the at least two GNSS satellites are determined, the estimated location area is usable to reduce the number of candidate correlation peaks prior to candidate pseudoranges being determined.

9 Claims, 12 Drawing Sheets

Related U.S. Application Data continuation-in-part of application No. PCT/CA2011/001194, filed on Oct. 26, 2011.

(60) Provisional application No. 61/406,921, filed on Oct. 26, 2010.

(51) Int. Cl.
*G01S 19/42* (2010.01)
*G01S 19/24* (2010.01)
*G01S 19/48* (2010.01)

(56) References Cited

U.S. PATENT DOCUMENTS

| | | | |
|---|---|---|---|
| 6,587,692 B1 | 7/2003 | Chen et al. | |
| 6,646,603 B2 | 11/2003 | Dooley et al. | |
| 6,728,637 B2 | 4/2004 | Ford et al. | |
| 6,865,395 B2 | 3/2005 | Riley | |
| 6,894,645 B1* | 5/2005 | Akopian | G01S 19/25 342/357.48 |
| 7,095,370 B1* | 8/2006 | van Diggelen | G01S 19/22 342/357.61 |
| 2002/0030625 A1 | 3/2002 | Cavallaro et al. | |
| 2003/0081662 A1* | 5/2003 | Rick | G01S 5/0215 375/150 |
| 2004/0008139 A1* | 1/2004 | Stone | G01S 11/10 342/451 |
| 2005/0192024 A1* | 9/2005 | Sheynblat | G01S 5/0263 455/456.1 |
| 2007/0104256 A1* | 5/2007 | Kimura | G01S 19/22 375/150 |
| 2007/0233383 A1* | 10/2007 | Churan | G01S 19/21 701/469 |
| 2008/0238769 A1 | 10/2008 | Verechtchiagine | |
| 2008/0309553 A1* | 12/2008 | Chansarkar | G01S 19/22 342/357.25 |

FOREIGN PATENT DOCUMENTS

| | | | |
|---|---|---|---|
| JP | 2001-305210 A | 10/2001 | |
| JP | 2001-520388 A | 10/2001 | |
| JP | 2004-518359 A | 6/2004 | |
| JP | 2008-26136 A | 2/2008 | |
| JP | 2008-51681 A | 3/2008 | |
| JP | 2010-503863 A | 2/2010 | |
| JP | 2011-523062 A | 8/2011 | |
| WO | 99/19743 A1 | 4/1999 | |
| WO | 02/059638 A2 | 8/2002 | |
| WO | 2008/033785 A1 | 3/2008 | |
| WO | 2009/149417 A1 | 12/2009 | |
| WO | 2010/141885 A2 | 12/2010 | |
| WO | 2011/124959 A1 | 10/2011 | |
| WO | WO-2011124959 A1 * | 10/2011 | G01S 19/22 |
| WO | 2011/153370 A2 | 12/2011 | |
| WO | 2012/055026 A1 | 5/2012 | |

OTHER PUBLICATIONS

Extended European Search Report dated Oct. 23, 2015, for Corresponding European Application No. 12872429.1-1812, 7 pages.
Chinese Office Action, dated Mar. 1, 2017, for Chinese Application No. 201280072892.5, 6 pages (with English translation).
Chinese Office Action, dated Sep. 26, 2016, for corresponding Chinese Application No. 201280072892.5, 6 pages (with English Translation).
International Search Report, dated Feb. 17, 2012, for International Application No. PCT/CA2011/001194, 7 pages.
Japanese Office Action, dated Feb. 24, 2016, for corresponding JP Application No. 2015-502022, with English Translation, 12 pages.
Chinese Office Action, with English Translation, dated Jan. 26, 2016, for corresponding Chinese Application No. 201280072892.5, 10 pages.
Canadian Office Action, dated Dec. 15, 2017, for Canadian Application No. 2,868,257, 4 pages.

* cited by examiner

METHOD AND APPARATUS FOR DETERMINING A POSITION OF A GNSS RECEIVER

CROSS-REFERENCE TO RELATED APPLICATION

This application is a continuation of U.S. application Ser. No. 13/434,684, filed Mar. 29, 2012 which is continuation-in-part of International Application No. PCT/CA2011/001194, filed Oct. 26, 2011, which claims priority from U.S. Provisional Application No. 61/406,921, filed Oct. 26, 2010, the contents of which are incorporated herein by reference in their entirety.

TECHNICAL FIELD

The present application relates methods and apparatus for acquiring satellites in a Global Navigation Satellite System (GNSS) and fixing a position of a GNSS receiver.

BACKGROUND DISCUSSION

A Global Navigation Satellite System (GNSS) receiver requires information from at least four GNSS satellites in order to determine its three dimensional position. The approximate distance between a GNSS satellite and a receiver is generally referred to as a pseudorange. The location of the GNSS satellites relative to the receiver has a major impact on the overall accuracy of the determined three dimensional position. In general, good satellite geometry occurs when satellites are evenly scattered relative to the receiver. When less than four GNSS satellites are acquired or in a case of bad satellite geometry, a stand-alone GNSS receiver may fail to fix its three-dimensional position. Difficulty in acquiring satellites is typically due to signal degradation and unavailability of satellites in challenging environments such as indoors, in densely forested areas or in deep urban locations, for example, where attenuation and multipath effects make it difficult for the GNSS receiver to discriminate and acquire information from the required number of GNSS satellites.

Other non-GNSS positioning techniques use several technologies such as WiFi and Cellular-based positioning, for example, which can provide a source of additional information to assist a stand-alone GNSS receiver when it cannot acquire a sufficient number of GNSS satellites or in the case of bad satellite geometry. Cooperation between a GNSS receiver and any other positioning technology is referred to as Assisted-GNSS (A-GNSS). The assistance information generally includes ephemeris data (real or synthetic), timing data and/or position estimation.

A well known GNSS is the Global Positioning System (GPS). In conventional Assisted-GPS (A-GPS) where initial position assistance is available, the initial position assistance may be used as an aid by the receiver to allow the receiver to focus on signals from satellites passing overhead. More generally, however, the initial position assistance just provides a fallback position in case the GPS receiver still fails to acquire information from a sufficient number of satellites or in case of bad satellite geometry. Such methods have been described as hybrid positioning and generally involve an either/or selection between the outputs of two or more positioning technologies including GPS, A-GPS, WiFi and Cellular-based positioning, for example.

SUMMARY

In an aspect of the present disclosure, there is provided, a method of determining a position of a GNSS receiver including: receiving, at the GNSS receiver, information from at least two GNSS satellites; receiving, at the GNSS receiver, an estimated location area from a non-GNSS positioning application; determining candidate pseudoranges corresponding to candidate correlation peaks determined based on the information received from the at least two GNSS satellites; determining possible positions of the GNSS receiver using the candidate pseudoranges and the estimated location area; determining a best possible position of the GNSS receiver from the possible positions; and setting the best possible position as the position of the GNSS receiver; wherein when multiple candidate correlation peaks corresponding to one of the at least two GNSS satellites are determined, the estimated location area is usable to reduce the number of candidate correlation peaks prior to candidate pseudoranges being determined.

In another aspect of the present disclosure, there is provided, a mobile device including: an antenna; a GNSS receiver for receiving information from at least two GNSS satellites and for receiving an estimated location area from a non-GNSS positioning application; and a processor in communication with the GNSS receiver; the processor determining candidate pseudoranges corresponding to candidate correlation peaks determined based on the information received from the at least two GNSS satellites, determining a best possible position of the GNSS receiver from possible positions of the GNSS receiver determined using the candidate pseudoranges and the estimated location area and setting the best possible position as the position of the GNSS receiver; wherein when multiple candidate correlation peaks corresponding to one of the at least two GNSS satellites are determined, the estimated location area is usable to reduce the number of candidate correlation peaks prior to candidate pseudoranges being determined.

Collaboration methods between a GNSS receiver and non-GNSS positioning with respect to the use of initial position assistance are described. In the methods and apparatus of the present embodiments, non-GNSS technologies collaborate with a GNSS receiver and provide positioning information to facilitate fixing of a position of a GNSS receiver when the GNSS receiver is unable to fix its position independently.

Other aspects and features of the present embodiments will become apparent to those ordinarily skilled in the art upon review of the following description of specific embodiments in conjunction with the accompanying figures.

BRIEF DESCRIPTION OF THE DRAWINGS

Embodiments of the present application will now be described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will be appreciated by a person skilled in the art that GPS is referred to throughout the present application by way of example only. The methods and apparatus of the present application are applicable to any GNSS.

Figure 1:
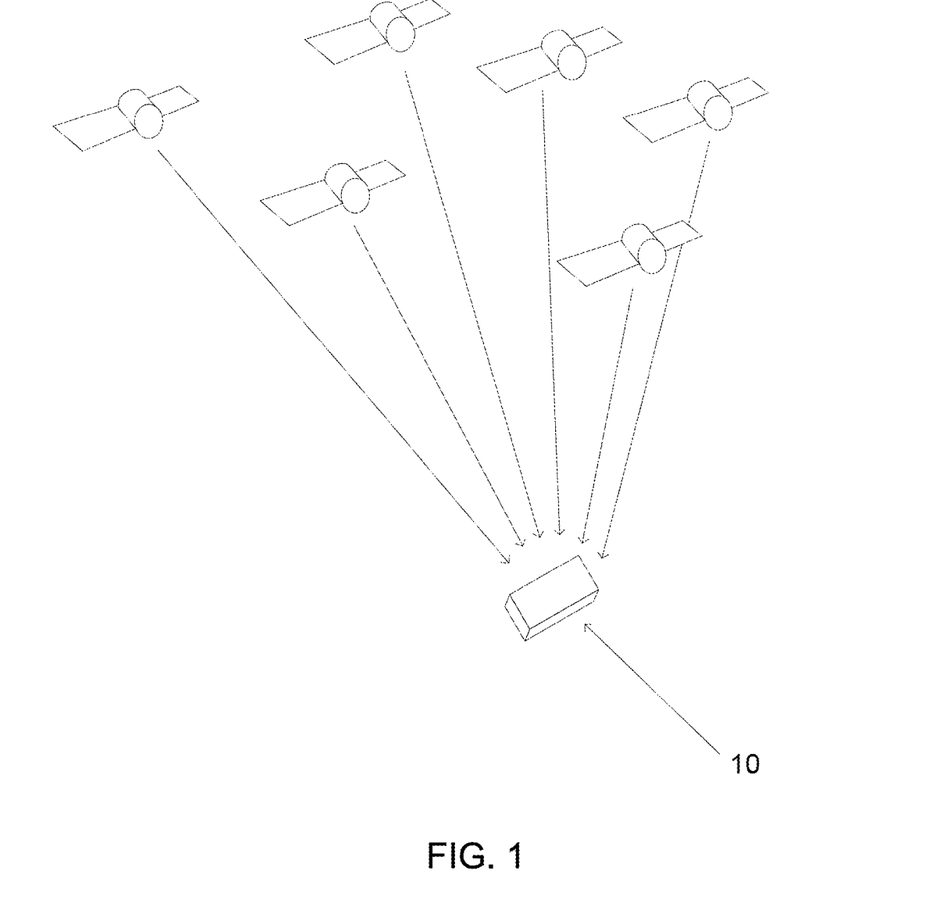
FIG. 1 is a schematic diagram of some components of a mobile device including a GPS receiver in communication with GPS satellites.

Referring to FIG. 1, a mobile device 10 receives information from GPS satellites in order to determine its position. The mobile device 10 may be a cell phone, a personal digital assistant, a Smartphone, an asset tracking device, a tablet or laptop computer, a navigation device or another device that is capable of determining its position with the help of a non-GNSS positioning application. In the embodiments described herein, assisted position information derived from a non-GNSS positioning application includes at least initial, or coarse, position assistance, which helps the GPS receiver 14 locate the GPS satellites passing overhead more quickly than a stand-alone GPS receiver, for example. The assisted position information derived from a non-GNSS positioning application may be available locally, on the mobile device 10, may be available through direct communication with a computer or may be available via wireless communication with a server or database.

Figure 2:
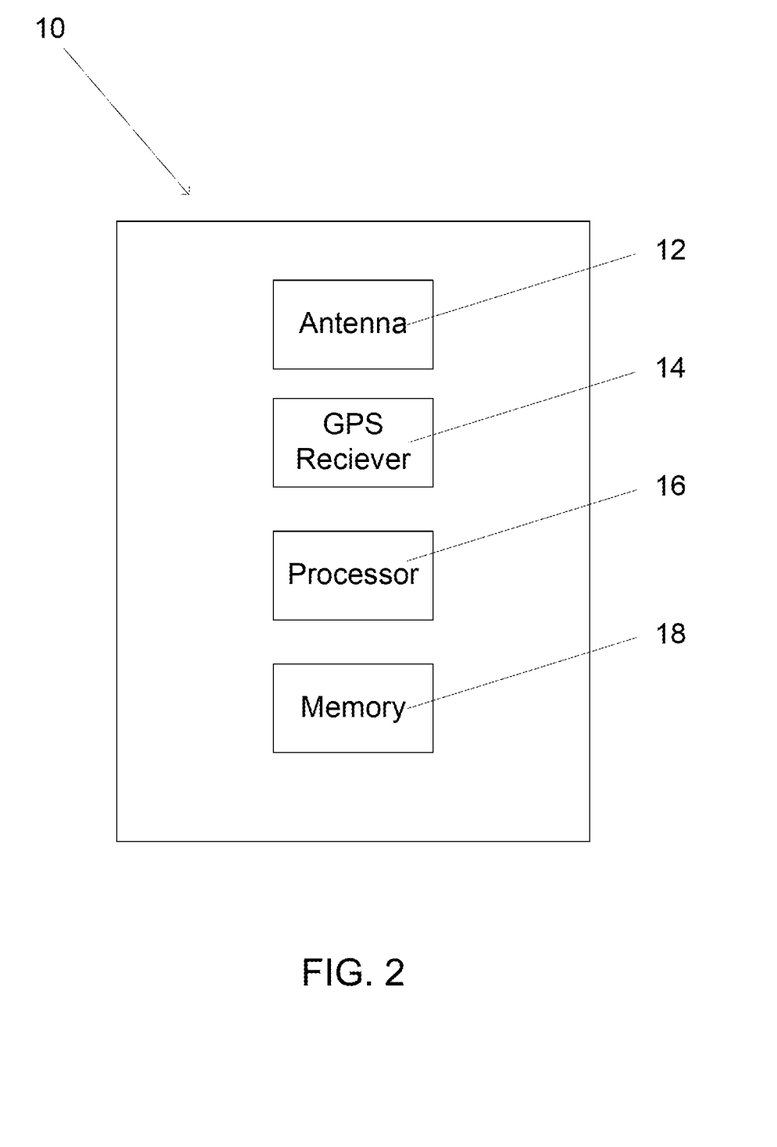
FIG. 2 is a block diagram of components of the mobile device of FIG. 1.

As shown in FIG. 2, the mobile device 10 includes an antenna 12 for receiving wireless signals, a GPS receiver 14 in communication with the antenna 12, a processor 16 in communication with the antenna 12 and the receiver 14. The mobile device 10 further includes a memory 18 that communicates with the processor 16. The mobile device 10 may communicate with a computer to receive an estimated location area from a non-GNSS positioning application via a cellular data network, such as GPRS, EDGE, 3G, 4G, WLAN, 762.11g, or 762.11n, for example. The mobile device 10 may further be capable of short range communication using Bluetooth™, for example. In one embodiment, the mobile device 10 includes an antenna 12 and some GPS receiver components. For example, the GPS receiver 14 may include a front end and a digitizer only. In this embodiment, other GPS receiver components, the processor 16 and the memory 18 may be hosted remotely on a server, for example.

Figure 3:
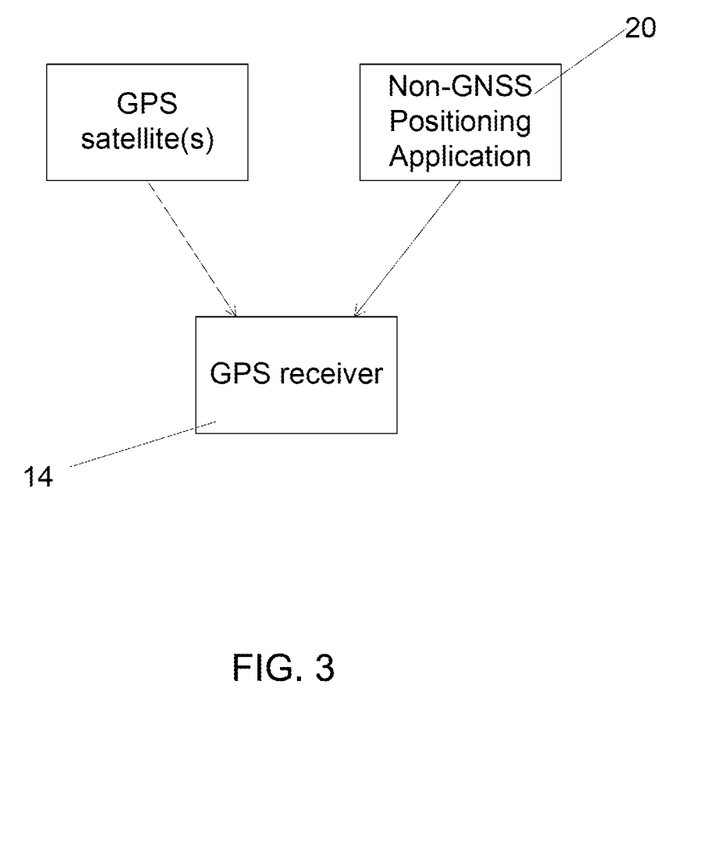
FIG. 3 is a block diagram of a GPS receiver in communication with GPS satellites and a non-GNSS positioning application.

As shown in FIG. 3, the GPS receiver 14 is capable of receiving signals from GPS satellites and communicating with a non-GNSS positioning software application 20. The non-GNSS positioning software application 20 may be stored as computer readable code in memory 18 of the mobile device 10 or, alternatively, stored on a server remote from the mobile device 10. The non-GNSS positioning application 20 may be any positioning application capable of providing a coarse position estimate. Example of non-GNSS positioning applications include: WiFi-based positioning, cellular-based positioning (including but not limited to mobile standards such as GSM, CDMA, UMTS, LTE), land-mobile radio systems (including but not limited to VHF systems used in private or public safety applications), radio-broadcast positioning (including, but not limited position based on radio broadcast transmission towers such as FM or TV stations), or other data network infrastructure based positioning (including but not limited to IP routers, data modems or Internet protocols such as GeoIP).

Figure 4:
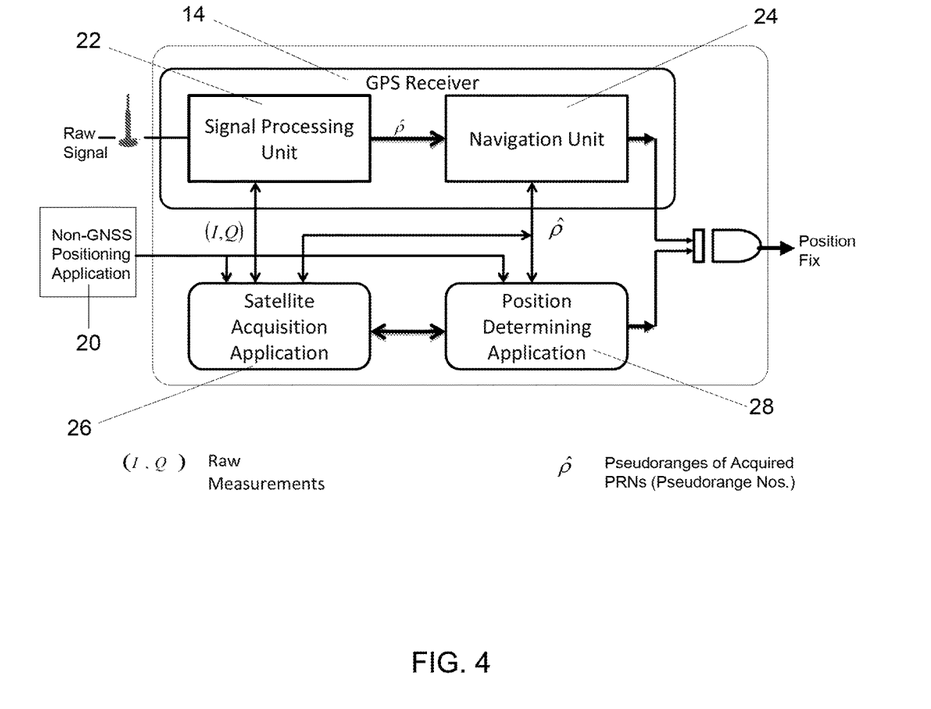
FIG. 4 is a block diagram depicting operation of a GPS receiver according to an embodiment.

Referring also to FIG. 4, the GPS receiver 14 includes a signal processing unit 22, which acquires satellites, and a navigation unit 24, which fixes the position of the GPS receiver 14. As shown, the GPS receiver 14 communicates with a satellite acquisition application 26 and a position determining application 28. The satellite acquisition application 26 and the position determining application 28 are software applications that are stored as computer readable code in memory 18 and are executable by the processor 16. In general, the satellite acquisition application 26 identifies "true" or "best" pseudoranges when multiple candidate pseudoranges are determined in order to acquire more GPS satellites and the position determining application 28 reduces positioning uncertainty when satellite availability is limited. The GPS receiver 14 of FIG. 4 is capable of fixing its position when four or fewer satellites are acquired by the signal processing unit 22.

Referring still to FIG. 4, the signal processing unit of the GPS receiver 14 receives satellite signals from available GPS satellites and sends pre-processed digitized satellite signals (I, Q) to the satellite acquisition application 26. The signal processing unit 22 determines and sends pseudoranges of acquired satellites to the navigation unit 24, which in turn sends the pseudoranges of acquired satellites to the position determining application 28. The estimated location area from the non-GNSS positioning application 20 is received by both the satellite acquisition application 26 and the position determining application 28 in order to fix a position of the GPS receiver 14. In one embodiment, the satellite signals and the estimated location area are received at generally the same time.

The satellite acquisition application 26 uses the estimated location area from the non-GNSS positioning application 20 to discriminate between multiple candidate peaks in order to determine which one is the "true" or "best" correlation peak. When the GPS receiver correlates the pre-processed satellite signal with its locally generated replicas, the GPS receiver: i) may not find any candidate correlation peaks in the signal, ii) may find multiple candidate correlation peaks due to signal attenuation or multipath, or iii) may find one distinct candidate correlation peak. When one distinct candidate correlation peak is identified, a pseudorange associated with that candidate correlation peak is determined by the GPS receiver 14 to be an acquired satellite.

Figure 5:
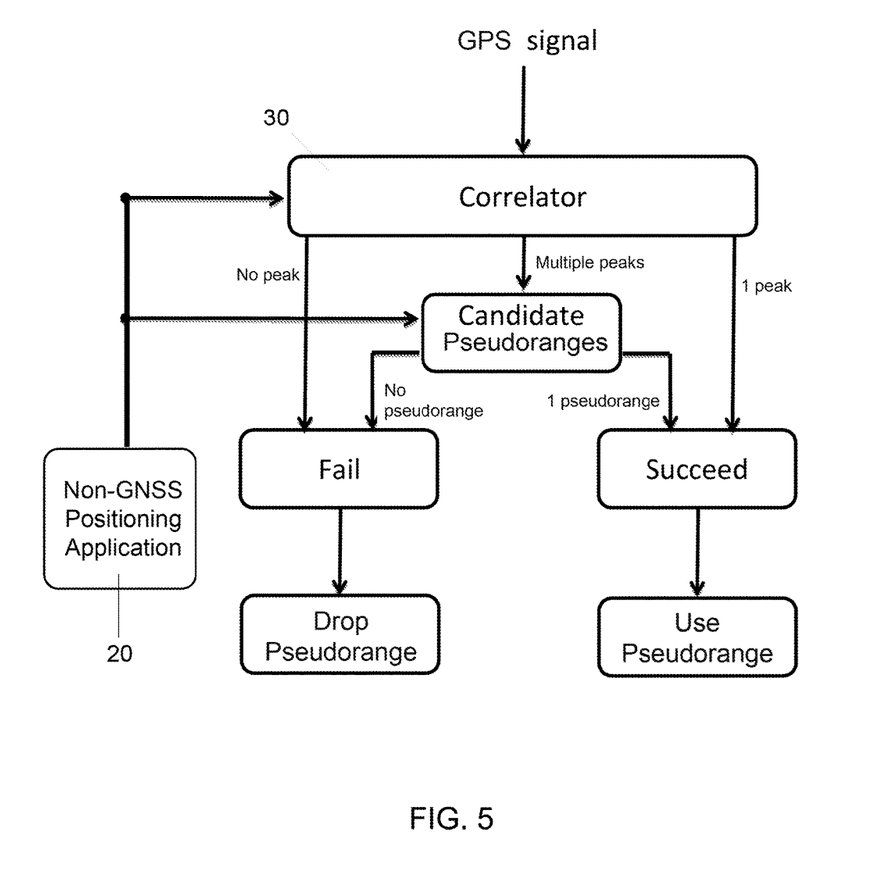
FIG. 5 is a flow diagram depicting processing of correlation peaks.

Referring to FIG. 5, correlation peaks are output from a correlator 30, or matched filter, which is part of the signal processing unit 22, of the GPS receiver 14. The inputs of the correlator 30 are the GPS pre-processed signals and its replicas locally generated in the GPS receiver 14. The correlator 30 may be referred to a grid of correlators because the correlator 30 includes a predefined search space. In prior art (assisted) GPS receivers, no satellite may be acquired unless a distinct correlation peak is found.

In general, correlators 30 use the estimated location area from the non-GNSS positioning application 20 to define a correlation search space, accelerate a search and reduce an area of uncertainty in order to extract a distinct correlation peak. When a distinct correlation peak is not found, multiple candidate correlation peaks are considered by the satellite acquisition application 26. When multiple candidate correlation peaks are identified for a particular GPS satellite, candidate pseudoranges that correspond to the multiple candidate correlation peaks are calculated. The estimated location area from the non-GNSS positioning application 20 is used in combination with pseudoranges of GPS satellites that have been acquired (i.e. satellites for which a distinct correlation peak was found) to select the "true" or "best" pseudorange out of the candidate pseudoranges when a "true" or "best" pseudorange exists.

Figure 6:
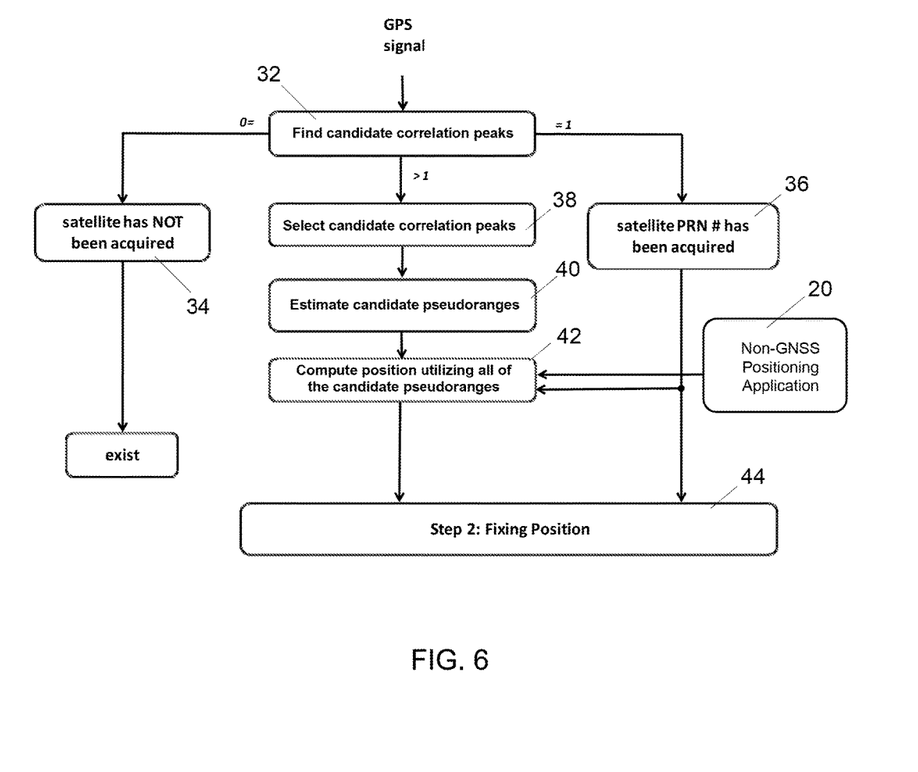
FIG. 6 is a flow diagram depicting operation of a satellite acquisition application.

Referring to FIG. 6, the satellite acquisition application 26 identifies candidate correlation peaks in the signal at 32. When no candidate correlation peaks are found, no GPS satellite may be acquired at 34. When one distinct correlation peak is found, then the GPS satellite is acquired at 36. When more than one candidate correlation peak is found, candidate correlation peaks are selected, at 38, and candidate pseudoranges are determined at 40. All of the candidate pseudoranges, which includes the pseudoranges of GPS satellites that have been acquired, and the estimated location area from the non-GNSS positioning application 20 are used at 42 to: estimate the receiver's position using an estimator, which is part of the satellite acquisition application 26, detect incorrect pseudoranges out of the candidate pseudoranges and then re-estimate the receiver's position with the best pseudorange using the estimator. A statistical analysis is used for identifying the best pseudorange among the candidates. The statistical analysis relies on the estimator's misclosure vector, which identifies the error between the candidate pseudoranges and those estimated by the estimator, and a priori knowledge of the quality of the pseudoranges, which is a function of received signal strength and satellite elevation and provides the initial standard deviation of the pseudoranges. Based on the a priori knowledge of the quality of pseudoranges and the misclosure vector, a statistical distribution is obtained. Candidate pseudoranges that do not fall into the statistical distribution are rejected, leaving behind the best pseudorange. At 44, the position of the GPS receiver may be fixed using the navigation unit 24 or the position determining application 28.

Figure 7:
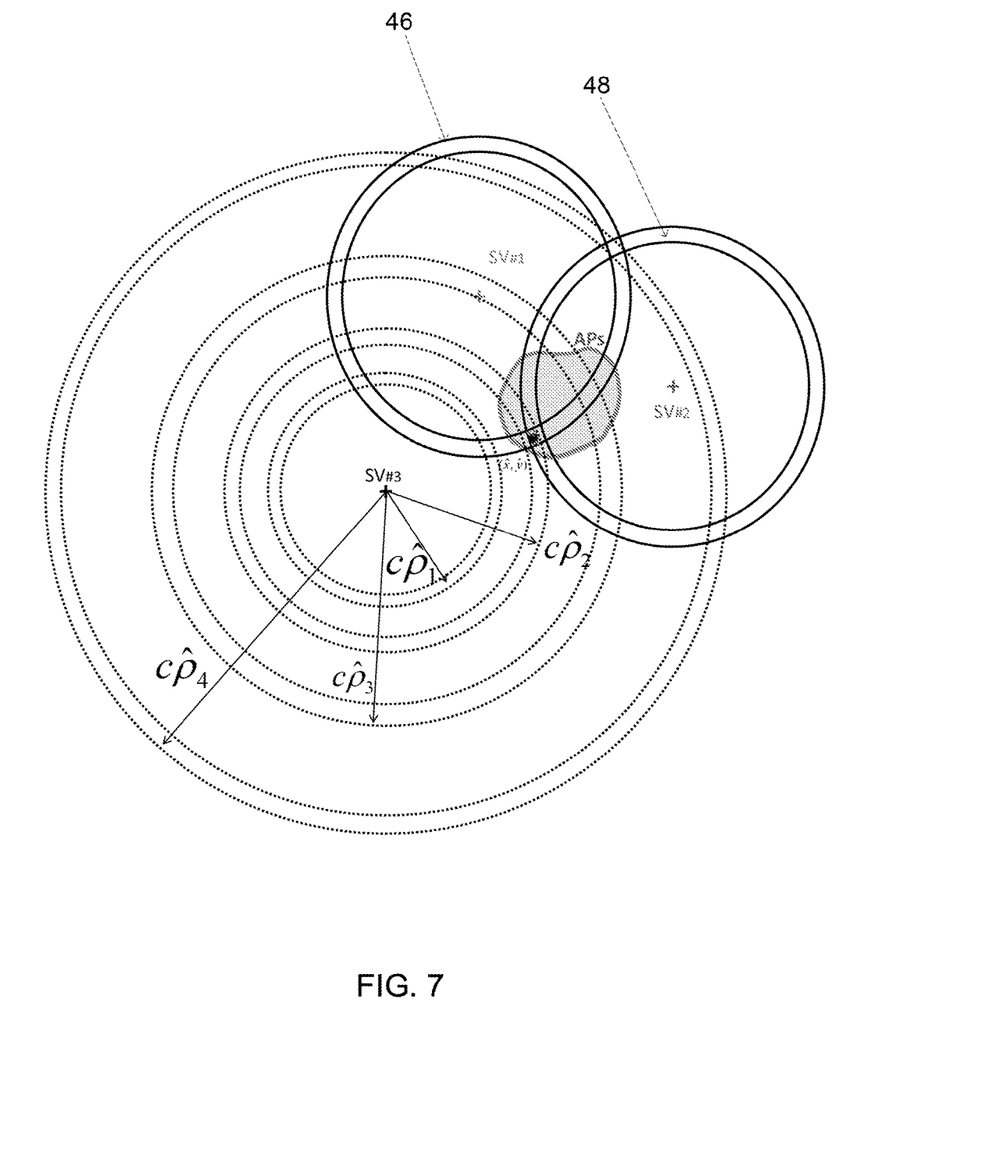
FIG. 7 is a schematic diagram showing possible positions of a GPS receiver as determined using the satellite acquisition application.

Referring to FIG. 7, in one example, four candidate correlation peaks of a satellite vehicle (SV) are found and four candidate pseudoranges ($c\hat{\rho}_1$, $c\hat{\rho}_2$, $c\hat{\rho}_3$ and $c\hat{\rho}_4$) are calculated based on the candidate correlation peaks. The estimator then uses all of the candidate pseudoranges, which includes the pseudoranges of GPS satellites that have been acquired, identified by reference numerals 46 and 48, and the estimated location area from the non-GNSS positioning application 20 to estimate the receiver's position. The estimated position will be biased because of the presence of incorrect pseudoranges. Statistical analysis is then performed using the a priori knowledge of the pseudoranges and the misclosure vector to identify the "true" or "best" pseudorange. Then the estimator uses the best pseudorange and the estimated location area from the non-GNSS positioning application 20 to estimate the receiver's final position, which is the unbiased and best estimate. As shown in FIG. 7, the candidate pseudorange $c\hat{\rho}_2$ is identified as the best pseudorange. Thus, a third GPS satellite is considered to be acquired with a true pseudorange value, $\hat{\rho}_{SV_{\#3}}$ equal to $c\hat{\rho}_2$. As shown, the final two-dimensional position fix is estimated from the acquired GPS satellites and the position uncertainty of the estimated location area from the non-GNSS positioning application.

In general, the satellite acquisition application 26 increases the number of acquired GPS satellites and hence, improves overall satellite availability and satellite geometry. The satellite acquisition application 26 has the ability to accept multiple candidate correlation peaks, perform calculations therewith, and then use the estimated location area from the non-GNSS positioning application 20 to recommend the "true" or "best" correlation peak.

Figure 8:
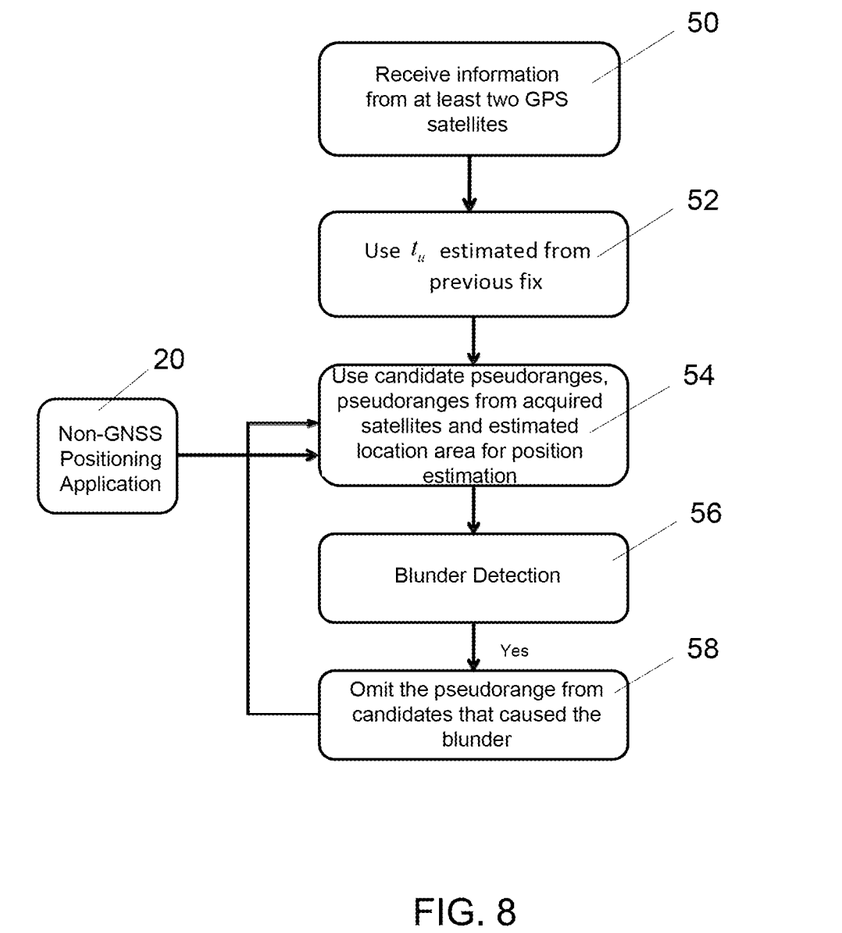
FIG. 8 is a flow diagram depicting a method of determining a position of a GPS receiver using assisted positioning information from a non-GNSS positioning application.

Referring back to FIG. 4, the position determining application 28 uses different methods to find a fix for the position of the GPS receiver 14 depending on the number of GPS satellites that are available. Referring also to FIG. 8, when information from three GPS satellites is received, the position of the GPS receiver 14 is solved using the estimated location area from the non-GNSS positioning application 20, receiver clock bias ($t_u$) and all of the pseudoranges, which may include distinct as well as candidate pseudoranges. For example, two distinct correlation peaks of two satellites and multiple candidate correlation peaks of the third satellite may be included.

Referring to FIG. 8, at 50, information from at least two satellites is received and pseudoranges are computed either by one or both of the signal processing unit 22 and the satellite acquisition application 26. At 52, the receiver clock bias ($t_u$) is estimated from the GPS receiver's previous position fix. The position determining application 28 then computes the possible GPS receiver positions using candidate pseudoranges, which may include pseudoranges of acquired GPS satellites, the estimated location area from the non-GNSS positioning application 20 and the receiver clock bias ($t_u$) at 54. The statistical outputs of the position determining application 28, such as the misclosure vector, are then used for detecting the incorrect pseudoranges using the statistical analysis at 56, which may be referred to as a blunder detection method. The blunder detection method generally uses the difference between estimated pseudoranges determined at 54 and the candidate pseudoranges corresponding to the non-acquired satellites determined at 50. Candidate pseudoranges causing statistical blunders are identified by the blunder detection method at 56 and, at 58, the candidate pseudoranges causing statistical blunders are removed leaving the best pseudorange, which is then used for position estimation, at 54, in a subsequent iteration. When no blunders are detected at 56, the method ends at 56.

Figure 9A:
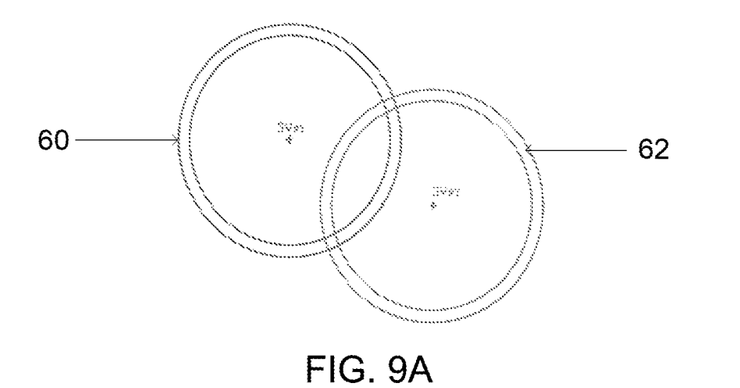
FIG. 9A is a schematic diagram showing two possible positions of a GPS receiver when information from two GPS satellites is received.

In one example, when information from two GPS satellites 60, 62 is received as shown in FIG. 9A, the GPS receiver 14 is unable to estimate its position and hence executes the method of determining a location of a GPS receiver 14 of FIG. 8. At 50, the GPS receiver 14 receives information from two GPS satellites. In this example, two distinct correlation peaks are determined so that a single pseudorange corresponding to each GPS satellite is determined. At 52, the receiver clock bias ($t_u$) is estimated from the GPS receiver's previous position fix. The estimator of the position determining application 28 then computes the possible GPS receiver positions using the pseudoranges of the GPS satellites that have been acquired, the estimated location area from the non-GNSS positioning application 20 and the receiver clock bias ($t_u$) at 54. At 56, the estimator's misclosure vector and a priori knowledge of the quality of the pseudoranges are used by the blunder detection method to identify incorrect candidate pseudoranges. Since no candidate pseudoranges were initially determined, no blunders are detected and the receiver position estimation ends at 56.

Figure 9B:
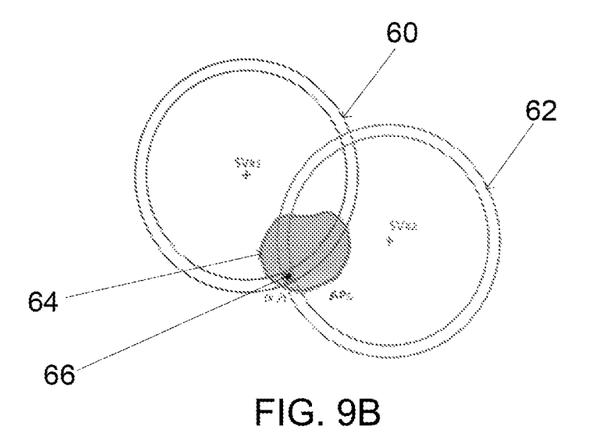
FIG. 9B is a schematic diagram showing possible positions of a GPS receiver determined using the method of FIG. 8.

As shown in FIG. 9B, the estimated position 64 derived from the non-GNSS positioning application 20 using, for example, Access Points (APs), is used by the estimator to estimate the receiver's position. An AP is a wireless router or device that is used to access data networks. An AP may be WLAN router, 762.11g, 762.11b or a cellular base station (i.e. GPRS, EDGE, 3G, 4G). As shown, the final position 66 estimates for the GPS receiver 14 are based on acquired GPS satellite information, 60 and 62, as well as the estimated location area 64 from the non-GNSS positioning application, (i.e. two-dimensional position variance).

Figure 9C:
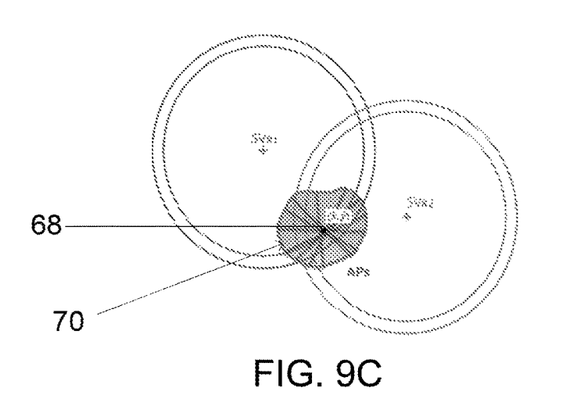
FIG. 9C is a schematic diagram showing possible positions of a GPS receiver as determined using a hybrid positioning system of the prior art.

FIG. 9C schematically depicts how a hybrid positioning system of the prior art determines a position of a GPS receiver. In this scenario, the hybrid positioning engine relies more on an estimated location area 70 from the non-GNSS positioning application. This may occur when the pseudoranges have greater uncertainty (ie. large standard deviation) when compared to the estimated location area 70 from the non-GNSS positioning application. The final position fix 68 is represented by ($\hat{x}$, $\hat{y}$), while the shaded area around the fixed position represents the positioning uncertainty retrieved from the estimated location area 78 from the non-GNSS positioning application.

An advantage to the method of determining a location of a GPS receiver 14 is that the final position, as well as the position uncertainty, is based on information from the acquired GPS satellites as well as the estimated location area from the non-GNSS positioning application. As such, the final position fix, and its uncertainty, is more accurate and reliable than prior art hybrid and non-GNSS positioning applications where more weight was given to the location area from the non-GNSS positioning application.

Figure 10:
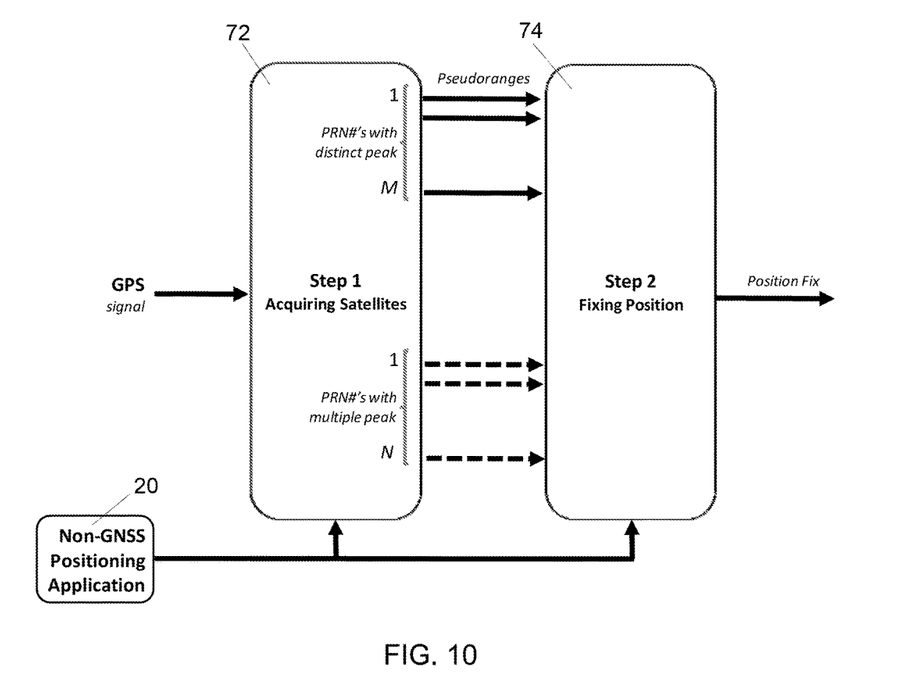
FIG. 10 is a schematic diagram depicting operating of a GPS receiver using a satellite acquisition application and a position determining application according to an embodiment.

The GPS receiver 14 may operate using the satellite acquisition application 26, the position determining application 28 or both the satellite acquisition application 26 and the position determining application 28. Referring to FIG. 10, the GPS receiver 14 uses the satellite acquisition application 26 to acquire satellites, at 72, and the position determining application 28 to fix a position of the GPS receiver 14, at 74. Using the satellite acquisition application 26, two different sets of pseudoranges are determined. The first set of pseudoranges, [1, . . . , M], are derived from acquired GPS satellites each with a distinct correlation peak. The second set of pseudoranges, [1, . . . , N], are candidate pseudoranges derived from multiple candidate correlation peaks for each GPS satellite pseudorange. The satellite acquisition application 26 determines the "true" or "best" pseudorange for the respective GPS satellites based on blunder detection and the non-GNSS positioning application. When the "true" or "best" pseudoranges have been determined, the satellite pseudoranges are considered to be acquired and are then used in the position determining application 28 of FIG. 4.

Figure 11:
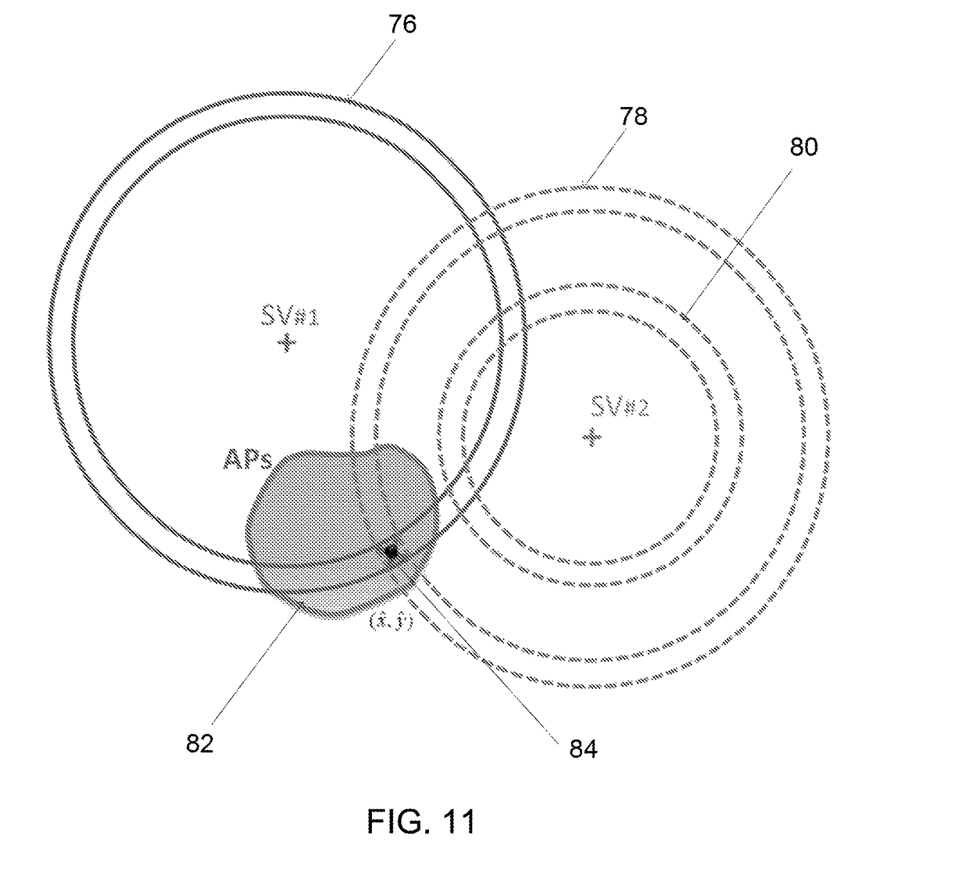
FIG. 11 is a schematic diagram showing possible positions of a GPS receiver using a satellite acquisition application and a position determining application according to an embodiment.

Referring to FIG. 11, another example of a GPS receiver 14 that uses both the satellite acquisition application 26 and the position determining application 28 to acquire satellites and fix a position of the GPS receiver 14 is shown. In this example, one GPS satellite has been acquired by a stand-alone GPS receiver, as indicated by reference numeral 76, and the stand-alone GPS receiver fails to fix its position. In order to acquire a second GPS satellite, two candidate correlation peaks, which were found by the correlator 32, are used to calculate two candidate pseudoranges, which are indicated by reference numerals 78 and 80. The three candidate pseudoranges, which includes the pseudorange of the acquired GPS satellite, along with the estimated location area 82 from a non-GNSS positioning application are used by the estimator to estimate the receiver's position. The blunder detection method then identifies the best pseudorange, which is used by the estimator to fix the position 84 of the GPS receiver 14.

In one embodiment, a GPS receiver 14 is capable of switching between operating as: i) a standalone GPS receiver, which receives signals from four GPS satellites, ii) an assisted-GPS receiver, which uses GNSS orbital data or estimated location areas from a non-GNSS positioning application to allow the GPS receiver to locate GPS satellites in range more quickly, iii) a GPS receiver operable when satellite availability is limited and iv) a GPS receiver 14 operable when more than one correlation peak is determined.

Figure 12:
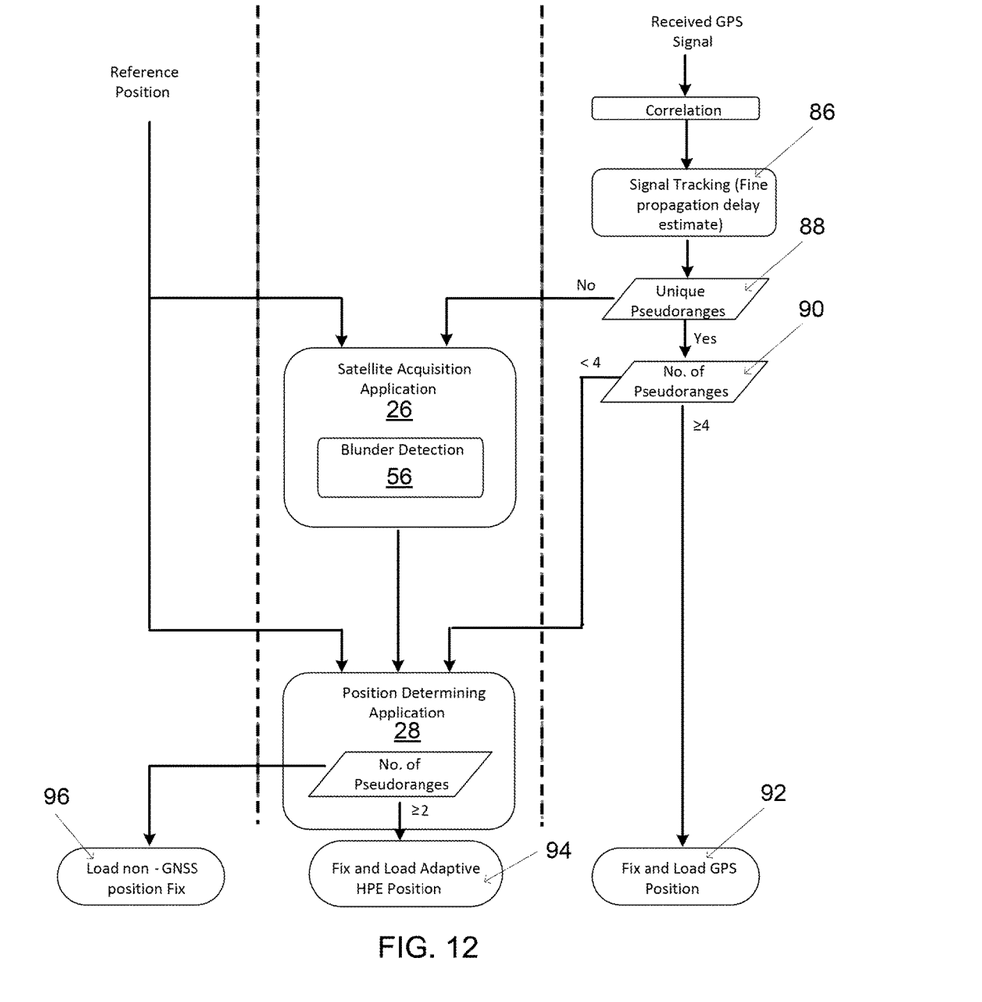
FIG. 12 is a flowchart depicting collaboration between the GPS receiver, satellite acquisition application, position determining application and position assisted-GPS application.

FIG. 12 depicts an example of collaboration between the GPS receiver 14, the satellite acquisition application 26, the position determining application 28 and the non-GNSS positioning application 20. The satellite acquisition application 26 and the position determining application 28 of the mobile device 10 may collaborate with other related satellite acquisition applications 26 and position determining applications 28, operating on the same or different mobile devices. In general, GPS receivers in different devices may collaborate when the GPS receivers are within an acceptable range of one another based on non-GNSS positioning.

The signal processing unit 22 of the GPS receiver 14 performs correlation and identifies the number of candidate correlation peaks. As shown, the signal processing unit 22 uses a signal tracking application 86 to convert the candidate correlation peaks to pseudoranges by estimating the propagation delay. At 88, when all of the pseudoranges are identified as unique and the total number of pseudoranges is determined, at 90, to be at least four then GPS position is fixed, at 92, without using the location area estimate from the non-GNSS positioning application 20. At 88, when the pseudoranges are not unique due to multiple candidate correlation peaks, the satellite acquisition application 26 is used for identifying the best pseudorange using the blunder detection method 56. After blunder detection, the position determining application 28 is used to estimate the receiver's position, which includes checking for at least two pseudoranges and either i) estimating the receiver's position using all of the pseudoranges as well as the location area estimate from the non-GNSS positioning application, as indicated at 94, or, ii) reporting the non-GNSS position as a fall back, as indicated at 96.

The methods and apparatus of the present embodiments facilitate fixing of a three-dimensional position of a GNSS receiver, such as a GPS receiver, when the number of acquired satellites is less than four or the satellite geometry is far from optimal. By integrating GNSS and non-GNSS positioning systems, rather than using a non-GNSS positioning system as a fallback, greater accuracy in position determination may be achieved. The methods and apparatus described herein provide 1) improved discrimination between possible pseudoranges so that more GPS satellites may be acquired as compared to stand-alone modes and 2) a reduction in the area of positioning uncertainty.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A method of determining a position of a GNSS receiver comprising:
    receiving, at the GNSS receiver, information from at least two GNSS satellites at multiple time intervals;
    receiving, at a processor in communication with the GNSS receiver, an estimated location area from a non-GNSS positioning application, the position of the GNSS receiver located within the estimated location area;
    utilizing the estimated location area to define a correlation search space;
    determining, at the processor, a single candidate correlation peak corresponding to a first one of the at least two GNSS satellites and acquiring the first one of the at least two GNSS satellites, a first pseudorange corresponding to the first one of the at least two GNSS satellites;
    determining, at the processor, multiple candidate correlation peaks within the correlation search space corresponding to a second one of the at least two GNSS satellites;
    determining, at the processor, multiple candidate pseudoranges corresponding to the multiple candidate correlation peaks of the second one of the at least two GNSS satellites;
    utilizing receiver clock bias estimated from previous position fix to determine, at the processor, possible positions of the GNSS receiver utilizing the estimated location area, the first pseudorange and the multiple candidate pseudoranges of at least two GNSS satellites;
    utilizing blunder detection, at the processor to select a best pseudorange from the multiple candidate pseudoranges for the second one of the at least two GNSS satellites by identifying ones of the possible positions associated with statistical blunders and removing ones of the multiple candidate pseudoranges utilized to determine the ones of the possible positions associated with statistical blunders;
    utilizing the first pseudorange, the best pseudorange, and the estimated location area to determine, at the processor, the position of the GNSS receiver;
    wherein multiple candidate correlation peaks are due to one or both of: attenuation and multipath.

2. A method as claimed in claim 1, wherein the blunder detection includes statistical analysis based on a misclosure vector from the second one of the at least two GNSS satellites and pseudorange quality of the multiple candidate pseudoranges.

3. A method as claimed in claim 2, wherein the pseudorange quality is based on received signal strength and satellite elevation of the second one of the at least two GNSS satellites.

4. A method as claimed in claim 1, wherein the correlation search space is a function of position uncertainty of the estimated location area.

5. A method as claimed in claim 1, wherein the non-GNSS positioning application is based on one of: WiFi, Cellular, land-mobile radio, radio broadcast and GeoIP.

6. A method as claimed in claim 1, comprising receiving GNSS satellite information from a GNSS receiver of another mobile device.

7. A non-transitory computer readable medium, having stored thereon, instructions executable by a processor to:
    define a correlation search space utilizing an estimated location area received from a non-GNSS positioning software application, the position of the GNSS receiver located within the estimated location area;
    determine a single candidate correlation peak corresponding to a first one of at least two GNSS satellites utilizing information from the first one of the at least two GNSS satellites and acquiring the first one of the at least two GNSS satellites, a first pseudorange corresponding to the first one of the at least two GNSS satellites;
    determine multiple candidate correlation peaks within the correlation search space corresponding to a second one of the at least two GNSS satellites utilizing information from the second one of the at least two GNSS satellites and determine multiple candidate pseudoranges corresponding to the multiple candidate correlation peaks of the second one of the at least two GNSS satellites;
    utilize receiver clock bias estimated from a previous position fix to determine possible positions of the GNSS receiver utilizing the estimated location area, the first pseudorange and the multiple candidate pseudoranges of the at least two GNSS satellites; and
    utilize blunder detection to detect a best pseudorange from the multiple candidate pseudoranges for the second one of the at least two GNSS satellites by identifying ones of the possible positions associated with statistical blunders and removing ones of the multiple candidate pseudoranges utilized to determine the ones of the possible positions associated with statistical blunders.

8. A mobile device comprising:
    an antenna in communication with a GNSS receiver for receiving information from at least two GNSS satellites and for receiving an estimated location area from a non-GNSS positioning software application, the position of the GNSS receiver located within the estimated location area; and
    a processor in communication with the GNSS receiver; the processor:
        determining a single candidate correlation peak corresponding to a first one of the at least two GNSS satellites by searching within a correlation search space defined by the estimated location area and determining multiple candidate pseudoranges corresponding to the multiple candidate correlation peaks,
        utilizing a receiver clock bias estimate from a previous position fix to determine possible positions of the mobile device utilizing the estimated location area, the first pseudorange and the multiple candidate pseudoranges, detecting a best pseudorange from the multiple candidate pseudoranges utilizing blunder detection by identifying ones of the possible positions associated with statistical blunders and removing ones of the multiple candidate pseudoranges utilized to determine the ones of the possible positions associated with statistical blunders and determining a position estimate using the best pseudorange, the first pseudorange and the estimated location area;

wherein when multiple candidate correlation peaks are due to one or both of: attenuation and multipath.

9. A mobile device as claimed in claim 8, wherein the processor receives the information from a GNSS receiver of another mobile device.

\* \* \* \* \*